United States Patent Office 3,465,078
Patented Sept. 2, 1969

3,465,078
METHOD OF RECOVERING ANTIGENS FROM BORDETELLA PERTUSSIS CELLS
Sydney Z. Spiesel, 312 Willow,
New Haven, Conn. 06511
No Drawing. Filed Oct. 21, 1965, Ser. No. 500,222
Int. Cl. A61k 23/00; C12d 13/00
U.S. Cl. 424—92         7 Claims

ABSTRACT OF THE DISCLOSURE

Antigens are recovered from *Bordetella pertussis* cells by suspending the cells in an aqueous solution to form a suspension, disintegrating the cells by violent mechanical forces, such as sonic vibrations, to release the antigens from the cell and form an antigen-containing solution, precipitating the antigens from the antigen-containing solution with a protein salting out agent, washing the precipitates with acetone, and extracting the antigens from the precipitates with a saline solution having a pH in the range of about 6.5 to 9. Exemplary protein salting out agents are sulfates, chlorides, phosphates and acetates of ammonium, sodium or potassium. The most preferred protein salting out agent is ammonium sulfate.

Antigens recovered in accordance with this process may then be used to make whooping cough vaccine. This process obviates the necessity of heating the antigens, which reduces their potency.

---

This invention relates to a method of recovering an antigen from *Bordetella pertussis* and, more particularly, to a method of making a vaccine for whooping cough.

Vaccination against whooping cough, which is caused by *Bordetella pertussis*, is a well known and well regarded procedure used in most countries throughout the world. There are two principal types of whooping cough vaccines available. The first type is referred to as a "fluid vaccine" and comprises a simple suspension of killed and detoxified *Bordetella pertussis* cells in a physiological saline solution. The second type is referred to as an "alum-precipitated" vaccine and comprises *Bordetella pertussis* cells co-precipitated with potassium aluminum sulfate.

Although the present vaccines are efficacious, they are not without their drawbacks. There are two classes of deleterious effects exhibited by whooping cough vaccines. The first is a very common, mild general reaction characterized by irritability, fever, local redness, induration, tenderness, malaise, vomiting, or any combination of these effects. The second reaction, which fortunately is rare, is characterized by convulsions, temporary or permanent damage to the central nervous system, and sometimes death.

It is generally thought that these reactions are caused by the toxicity normally characteristic of whooping cough vaccines. *Bordetella pertussis* has long been known to contain heat-stable endotoxins and one or more heat-labile toxins. Conventional vaccines are "detoxified" in manufacture by heating them to a temperature in the range of about 50 to 56° C. Since a major portion of the toxicity is relatively more heat-labile than the antigen fraction, a compromise is effected; the heating removing most of the toxicity while leaving most of the potency of the original antigen. It is therefore desirable to provide a method of preparing a low-toxicity antigen-containing solution for whooping cough vaccine which obviates the necessity of heating the antigen-containing solution.

It is therefore an object of the present invention to provide a method for recovering an antigen from *Bordetella pertussis*.

It is another object to provide a method of making an antigen-containing solution from *Bordetella pertussis*.

It is an object to provide a method of making an antigen-containing solution for whooping cough vaccine.

It is still another object to provide a method of making a low-toxicity antigen-containing solution for whooping cough vaccine.

It is a further object to provide a method of making a low-toxicity antigen-containing solution for whooping cough vaccine which obviates the necessity of heating the antigen-containing solution.

These and other objects more apparent hereinafter are accomplished in accordance with the method of the present invention by disintegrating *Bordetella pertussis* cells by violent mechanical force in an aqueous medium thereby forming an antigen-containing solution, precipitating said antigens from said antigen-containing solution with a protein salting out agent, washing said precipitated antigens with acetone, and extracting antigens from said precipitates with an aqueous solution. The solution containing the extracted antigens is then used to make a fluid or an alum-precipitated vaccine by methods well known to those with ordinary skill in the art.

The invention, both as to its organization and method of operation, taken with further objects and advantages thereof, will be understood by reference to the following detailed description thereof.

In accordance with the method of the present invention, *Bordetella pertussis* cells are grown and harvested in a conventional manner well known to one with ordinary skill in the art. For example, these cells may be cultivated upon agar or charcoal-agar media and the bacterial growth harvested by washing the bacterial cells from the agar medium with water, a saline solution or any other aqueous solution which is chemically inactive to the cells. Preferably, the *Bordetella pertussis* cells are harvested to form a saline suspension of about $400 \times 10^9$ cells per milliliter.

The *Bordetella pertussis* cells in the suspension are disintegrated by subjecting the suspension to violent mechanical forces. Sonic disintegration of the *Bordetella petrussis* cells is preferred and this procedure per se is well known in the art, as exemplified by the Pillemer United States Patent No. 2,701,226, issued Feb. 1, 1955. Other suitable methods to effect the violent mechanical forces may be the application of shear forces, grinding with abrasives, rapid alternation of compression and rarefaction and cycles of alternating freezing and thawing. Suitable equipment to effect the disintegration is, of course, well known to one with ordinary skill in the art.

Upon disintegration of the cells the antigens go into solution or are finely dispersed therein, or both, to form an antigen-containing solution.

A protein salting out agent, which is well known to one with ordinary skill in the art, is mixed with the antigen-containing solution thereby precipitating, among other things, the protective antigens. Exemplary protein salting out agents are sulfates, chlorides, phosphates and acetates of ammonium, sodium and potassium which may be used in the crystalline form or as aqueous solutions. Ammonium sulfate is the most preferred salting out agent. It is further preferred to utilize a saturated aqueous solution of ammonium sulfate. Most preferably, the ratio by volume of the saturated ammonium sulfate solution to the antigen-containing solution is about 3:2. The precipitation is preferably conducted at about 0–5° C. After sufficient time has elapsed to permit complete precipitation, the precipitate is collected by centrifugation, filtration or other suitable means as will be recognized by one with ordinary skill in the art. The supernatant is discarded.

If desired, prior to precipitating the antigen-containing solution with a protein salting out agent, bacterial and other insoluble residue may be removed from the antigen-containing solution by decanting or other techniques well known to one with ordinary skill in the art.

The collected precipitates are then extracted and washed with acetone. The amount of acetone used will be in the range of about 1 to 15 parts or more by volume per one part by volume of precipitate. The acetone-extracted precipitate is separated from the acetone and dried. The antigens are extracted from the precipitates by washing them several times with a saline solution having a pH in the range of about 6.5 to 9. The insoluble material is removed by centrifugation or other suitable means and resuspended in a fresh saline solution. The supernatants are collected and pooled and form a low-toxicity antigen-containing solution for whooping cough vaccines.

A whooping cough vaccine is prepared from the antigen-containing solution by any of the methods heretofore employed and well known to those with ordinary skill in the art. The antigen-containing solution can be brought to the strength desired by dilution or by evaporation in vacuum at room temperature, for example, to provide a vaccine of desired potency. Suitable preservatives and buffering salts are added as necessary. An alum-precipitated vaccine may be prepared from the antigen-containing solution by the usual methods well known to those with ordinary skill in the art.

The advantages of the present invention will be more apparent from the following examples:

EXAMPLE I

Lot A

About 840 ml. of charcoal agar were inoculated by aerosol spray with a 24-hour culture of *Bordetella pertussis* suspended in 0.85% saline solution. The material was incubated at 37° C. for about 72 hours. The growth was harvested and suspended wih glass beads in 50 ml. of a 0.85% saline solution. A Raytheon DF–101 sonic oscillator was used to subject 45 ml. of the suspension to sonic vibrations for 20 minutes at 0–3° C. to form an antigen-containing solution.

Antigen-containing solution was mixed with a saturated solution of ammonium sulfate at room temperature. On a volume basis the ratio of the antigen-containing solution to the ammonium sulfate solution was 2:3. The mixture was bottled and allowed to incubate overnight at about 0–3° C. The precipitate was collected by centrifugation.

The precipitate was suspended in acetone at −23° C., separated therefrom by filtration, and the filtrate washed with acetone at −23° C. The precipitate was dried until no odor of acetone could be detected.

The filtrate was extracted overnight at about 0–3° C. with a 0.85% saline solution adjusted to a pH of 8.5 with 0.5% sodium hydroxide and the antigen-containing supernatant recovered after centrifugation.

A fluid vaccine and an alum-precipitated vaccine were prepared from the antigen-containing solution.

Lot B

The *Bordetella pertussis* cells were grown in a liquid culture in Cohen-Wheeler fluid medium with anionic exchange resin in place of starch. The cells, suspended in a 0.85% saline solution were sonically vibrated for 30 minutes to form an antigen-containing solution.

The antigen-containing solution was mixed with a solution of saturated ammonium sulfate and the precipitate recovered by centrifugation. The precipitate was washed twice with acetone and each time collected by centrifugation. The precipitate was then dried in a gentle air stream. The precipitate was extracted twice with saline solutions having a pH of 8.5. The antigen-containing saline solutions were pooled and buffered at pH 7.2. A fluid vaccine and an alum-precipitated vaccine were prepared from this antigen-containing solution.

EXAMPLE II

Potency tests

Alum-precipitated vaccines from the antigen-containing solutions of Lots A and B of Example I were compared with a reference vaccine supplied by the National Institutes of Health (NIH). The test employed was the mouse protection test adopted by the NIH wherein mice are injected with the test vaccines and the reference vaccine and then challenged with a highly virulent strain of *Bordetella pertussis* organisms. The results were utilized to compare the potency of the test vaccines to the reference vaccine. The NIH reference vaccine contains eight protective units per ml. (PU/ml.). The vaccines made from Lot A had a potency of 8.56 and 18.3 PU/ml. and the vaccine from Lot B had a potency of 11.12 PU/ml.

Therefore the vaccines made from the antigen-containing solutions made in accordance with the present invention have a greater potency than the NIH reference vaccine and satisfy the NIH requirements for potency.

EXAMPLE III

Toxicity test

Fluid vaccines made from the antigen-containing solutions of Lots A and B of Example I were tested to determine the toxicity of the antigens in a test procedure substantially as adopted by the NIH. Controlled amounts of a 0.5 ml. sample of the suspension under test were injected intraperitoneally into each of ten 14–16 gram mice. The mice were given free access to food and water before and during the test and weighed 72 hours and one week after vaccination. No deaths occurred. The results of these are summarized in Table A below:

TABLE A

| Antigen-containing solution | Dose per mouse [1] O.U. | Ave. wt. gain per mouse (gms.) | |
|---|---|---|---|
| | | 72 hours | 1 week |
| Lot A | 22.3 | 5.6 | 6.7 |
| Lot A | 44.6 | 4.6 | 6.0 |
| Lot B | 44.6 | 5.2 | 6.8 |

[1] Given in opacity units (O.U.), an optical density comparative measurement well known in the art as a means to indicate the concentration of bacterial cells in the vaccine. These values were based on the O.U. of the starting material in accordance with NIH practice.

This test demonstrated that the vaccines made from the antigen-containing solution made in accordance with the method of the present invention did not adversely affect the mice. Accordingly, these vaccines were at least of a very low toxic content and satisfy the NIH requirements with respect to toxicity.

While the embodiment described herein is at present considered to be preferred, it will be understood that various modifications and improvements may be made therein and it is intended to cover in the appended claims all such modifications and improvements as fall within the true spirit and scope of the invention.

What is claimed is:

1. In a method for recovering antigens from *Bordetella pertussis* cells wherein said cells are disintegrated by violent mechanical forces in an aqueous medium to form an antigen-containing solution, the improvement comprising precipitating said antigens from said antigen-containing solution with a protein salting out agent selected from the group consisting of sulfates, chlorides, phosphates and acetates of ammonium, sodium and potassium, washing said precipitated antigens with acetone, and extracting antigens from said precipitates with a saline solution having a pH in the range of about 6.5 to 9.

2. In the method of claim 1 wherein said cells are suspended in a saline solution and said suspension is subjected to sonic vibration to disintegrate said cells and from said antigen-containing solution.

3. In the method of claim 1 wherein said violent mechanical forces are sonic vibrations.

4. In a method for making an antigen-containing solution from *Bordetella pertussis* cells wherein said cells are suspended in an aqueous solution to form a suspension and said cells are disintegrated in said suspension by violent mechanical forces to release antigens from said cells and form an antigen-containing solution, the improvement comprising adding ammonium sulfate to said antigen-containing solution to form precipitates, separating said precipitates from said solution, washing said precipitates with acetone, and extracting antigens from said precipitates with a saline solution and recovering said saline solution having a pH in the range of about 6.5 to 9.

5. In the method of claim 4 wherein said cells are disintegrated by subjecting said suspension to sonic vibrations.

6. In the method of claim 5 wherein a saturated solution of ammonium sulfate is added to said antigen-containing solution.

7. A method of making an antigen-containing solution from *Bordetella pertussis* cells which comprises suspending said cells in a saline solution to form a suspension, disintegrating said cells by subjecting said suspension to sonic vibrations whereby antigens are released from said cells and form an antigen-containing solution, adding a saturated ammonium sulfate solution to said antigen-containing solution whereby precipitates are formed, the ratio of said antigen-containing solution to said ammonium sulfate solution on a volume basis being in the range of about 2:3, separating said precipitates from said solution, washing said precipitates with acetone, drying said precipitates, extracting antigens from said precipitates with a saline solution having a pH in the range of about 6.5 to 9, and separating the precipitates from said saline solution.

References Cited

Munoz et al., Proc. of the Soc. for Experimental Biology and Medicine, vol. 112, No. 3, pp. 799–805, March 1963.

RICHARD L. HUFF, Primary Examiner

PO-1050
(5/69)

UNITED STATES PATENT OFFICE
CERTIFICATE OF CORRECTION

Patent No. (65,006) 3,465,078     Dated September 2, 1969

Inventor(s) SYDNEY Z. SPIESEL

It is certified that error appears in the above-identified patent and that said Letters Patent are hereby corrected as shown below:

Column 3, line 37, change "wih" to -- with --;

Column 4, line 72, change "from" to -- form --.

SIGNED AND
SEALED

DEC 23 1969

(SEAL)
Attest:

Edward M. Fletcher, Jr.
Attesting Officer

WILLIAM E. SCHUYLER, JR.
Commissioner of Patents